United States Patent
Killen et al.

(10) Patent No.: US 12,508,472 B2
(45) Date of Patent: Dec. 30, 2025

(54) TRACKING THREE-DIMENSIONAL MOTION DURING AN ACTIVITY

(71) Applicant: FitForm Technologies Inc., Kent, WA (US)

(72) Inventors: Blaine Killen, Kent, WA (US); Eric Atcheson, Pearland, TX (US); Daniel Lee, Snellville, GA (US)

(*) Notice: Subject to any disclaimer, the term of this patent is extended or adjusted under 35 U.S.C. 154(b) by 249 days.

(21) Appl. No.: 17/344,886

(22) Filed: Jun. 10, 2021

(65) Prior Publication Data

US 2021/0394020 A1 Dec. 23, 2021

Related U.S. Application Data

(60) Provisional application No. 63/040,114, filed on Jun. 17, 2020.

(51) Int. Cl.
*A63B 24/00* (2006.01)

(52) U.S. Cl.
CPC ...... *A63B 24/0006* (2013.01); *A63B 24/0062* (2013.01); *A63B 24/0087* (2013.01); *A63B 2024/0012* (2013.01); *A63B 2024/0068* (2013.01); *A63B 2220/40* (2013.01); *A63B 2220/62* (2013.01); *A63B 2220/803* (2013.01); *A63B 2220/836* (2013.01); *A63B 2225/02* (2013.01)

(58) Field of Classification Search
None
See application file for complete search history.

(56) References Cited

U.S. PATENT DOCUMENTS

| | | | | |
|---|---|---|---|---|
| 9,654,234 B2* | 5/2017 | Feng | ...................... | H04L 43/028 |
| 9,683,865 B2* | 6/2017 | Keal | ........................ | G01P 21/00 |
| 9,687,180 B1* | 6/2017 | Deninger | ............... | G01C 21/14 |
| 9,706,962 B1* | 7/2017 | Uehara | ................ | A61B 5/1107 |
| 9,810,549 B2* | 11/2017 | Johnson | ................ | G01C 25/005 |
| 9,826,923 B2* | 11/2017 | Houmanfar | .......... | A61B 5/7267 |
| 10,065,074 B1* | 9/2018 | Hoang | ................. | G09B 19/003 |
| 10,157,488 B2* | 12/2018 | Chamdani | ............... | G06F 3/017 |
| 10,194,837 B2* | 2/2019 | Kanchan | .............. | A61B 5/6806 |
| 10,274,509 B1* | 4/2019 | Challoner | ............. | G01C 25/005 |
| 10,314,520 B2* | 6/2019 | Hauenstein | .......... | G01C 22/006 |
| 10,350,454 B1* | 7/2019 | Li | ......................... | G09B 19/003 |
| 10,357,688 B2* | 7/2019 | Wiebe | .................... | A61B 5/486 |
| 10,463,909 B2* | 11/2019 | Chang | .................... | G06V 40/23 |
| 10,638,210 B1* | 4/2020 | El Guindi | ............. | H04R 1/028 |
| 10,878,952 B1* | 12/2020 | Patel | .................. | G06K 7/10297 |
| 10,922,997 B2* | 2/2021 | Rubinstein | ........... | A61B 5/0022 |

(Continued)

FOREIGN PATENT DOCUMENTS

WO WO-2015048884 A1 * 4/2015 .......... A61B 5/0488

*Primary Examiner* — Xuan M Thai
*Assistant Examiner* — Andrew Bodendorf
(74) *Attorney, Agent, or Firm* — Jeffrey L. Streets

(57) ABSTRACT

A computer program product, apparatus, and method may include various operations. The operations may include calibrating a sensor device to identify a heading, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

36 Claims, 7 Drawing Sheets

(56) References Cited

U.S. PATENT DOCUMENTS

| | | | |
|---|---|---|---|
| 10,959,647 B2* | 3/2021 | Chang | G16H 50/30 |
| 10,973,439 B2* | 4/2021 | Douglas | A61B 5/150824 |
| 11,504,580 B2* | 11/2022 | Hong | A63B 21/072 |
| 2006/0025282 A1* | 2/2006 | Redmann | A61B 5/6804 |
| | | | 482/8 |
| 2008/0090703 A1* | 4/2008 | Rosenberg | A63B 24/00 |
| | | | 482/8 |
| 2010/0204952 A1* | 8/2010 | Irlam | G04G 21/02 |
| | | | 702/141 |
| 2010/0292943 A1* | 11/2010 | Minor | G01C 21/188 |
| | | | 702/64 |
| 2011/0092337 A1* | 4/2011 | Srinivasan | A63B 24/0006 |
| | | | 482/8 |
| 2014/0035761 A1* | 2/2014 | Burton | G01D 4/002 |
| | | | 340/870.02 |
| 2014/0257533 A1* | 9/2014 | Morris | A61B 5/1118 |
| | | | 700/91 |
| 2014/0270375 A1* | 9/2014 | Canavan | A61B 5/7246 |
| | | | 382/103 |
| 2014/0297008 A1* | 10/2014 | Perkins | G06V 40/23 |
| | | | 700/91 |
| 2014/0350703 A1* | 11/2014 | Flaction | G06V 40/23 |
| | | | 700/91 |
| 2014/0371885 A1* | 12/2014 | Ianni | A63B 69/0071 |
| | | | 700/91 |
| 2015/0032408 A1* | 1/2015 | Grenet | G06F 3/011 |
| | | | 702/141 |
| 2015/0038806 A1* | 2/2015 | Kaleal, III | A61B 5/4833 |
| | | | 600/301 |
| 2015/0100141 A1* | 4/2015 | Hughes | G06Q 10/0639 |
| | | | 700/92 |
| 2015/0133823 A1* | 5/2015 | Houmanfar | A61B 5/725 |
| | | | 600/595 |
| 2015/0202494 A1* | 7/2015 | Hollenbach | A61B 5/1118 |
| | | | 700/91 |
| 2015/0374283 A1* | 12/2015 | Walke | A61B 5/1126 |
| | | | 702/19 |
| 2016/0045159 A1* | 2/2016 | Balakrishnan | A61B 5/02438 |
| | | | 702/19 |
| 2016/0084869 A1* | 3/2016 | Yuen | G01P 3/44 |
| | | | 73/510 |
| 2016/0262687 A1* | 9/2016 | Vaidyanathan | A61B 5/4519 |
| 2016/0263458 A1* | 9/2016 | Mather | A63B 24/0062 |
| 2016/0325143 A1* | 11/2016 | Yuen | A63B 21/072 |
| 2017/0004285 A1* | 1/2017 | Anderton | G16H 70/00 |
| 2017/0076619 A1* | 3/2017 | Wallach | G09B 19/0038 |
| 2017/0084070 A1* | 3/2017 | Chamdani | G16H 50/30 |
| 2017/0086711 A1* | 3/2017 | Liao | A61B 5/1123 |
| 2017/0095181 A1* | 4/2017 | Hauenstein | A61B 5/1118 |
| 2017/0189752 A1* | 7/2017 | Mohrman | A63B 69/0028 |
| 2018/0058857 A1* | 3/2018 | Yost | G01R 33/0064 |
| 2018/0080768 A1* | 3/2018 | Vasilyuk | G01C 17/38 |
| 2018/0132748 A1* | 5/2018 | Perkins | A61B 5/08 |
| 2018/0133551 A1* | 5/2018 | Chang | A63B 24/0062 |
| 2018/0292429 A1* | 10/2018 | Fasel | G01P 15/14 |
| 2018/0330810 A1* | 11/2018 | Gamarnik | G16H 10/20 |
| 2018/0360350 A1* | 12/2018 | Blackadar | G16H 20/30 |
| 2018/0369637 A1* | 12/2018 | Hoang | G09B 19/003 |
| 2019/0009133 A1* | 1/2019 | Mettler May | G09B 19/0038 |
| 2019/0134454 A1* | 5/2019 | Mahoney | A63F 13/24 |
| 2019/0258905 A1* | 8/2019 | Rankin | A63B 69/0002 |
| 2019/0336825 A1* | 11/2019 | Douglas | G06V 40/23 |
| 2019/0374161 A1* | 12/2019 | Ly | A61F 2/68 |
| 2019/0388728 A1* | 12/2019 | Wang | G06F 18/29 |
| 2020/0015713 A1* | 1/2020 | Chang | G01P 15/00 |
| 2020/0105041 A1* | 4/2020 | Garofalo | G06T 13/40 |
| 2020/0126284 A1* | 4/2020 | Garofalo | G16H 40/67 |
| 2020/0132457 A1* | 4/2020 | Li | G01C 22/006 |
| 2020/0282261 A1* | 9/2020 | Patil | G06F 3/011 |
| 2020/0397384 A1* | 12/2020 | Cheung | A61B 5/7264 |
| 2020/0401224 A1* | 12/2020 | Cotton | A61B 5/742 |
| 2021/0008413 A1* | 1/2021 | Asikainen | A63B 24/0087 |
| 2022/0001262 A1* | 1/2022 | Zhao | A63B 71/0686 |
| 2022/0080262 A1* | 3/2022 | Pluschkell | G06N 3/044 |
| 2022/0193522 A1* | 6/2022 | Jung | A61B 5/6814 |
| 2022/0198833 A1* | 6/2022 | Fralick | G06F 18/251 |
| 2022/0226695 A1* | 7/2022 | Madonna | A61B 5/11 |
| 2022/0241643 A1* | 8/2022 | Douglas | A63B 24/0006 |
| 2023/0123441 A1* | 4/2023 | Kaji | A61B 5/1123 |
| | | | 73/865.4 |
| 2023/0233403 A1* | 7/2023 | Nunokawa | A61B 5/1122 |
| | | | 601/41 |
| 2024/0248115 A1* | 7/2024 | Omid-Zohoor | G01P 15/08 |

* cited by examiner

TRACKING THREE-DIMENSIONAL MOTION DURING AN ACTIVITY

CROSS-REFERENCE TO RELATED APPLICATIONS

This application is a nonprovisional patent application claiming the benefit of U.S. provisional patent application Ser. No. 63/040,114 filed on Jun. 17, 2020, which application is incorporated by reference herein in its entirety.

BACKGROUND

The present disclosure relates to wearable devices and methods for personal activity tracking.

BACKGROUND OF THE RELATED ART

An activity tracker is a device or application for monitoring and tracking a metric of a movement or activity, such as number of steps taken, distance run or walked, calories burned, and heart rate. Some of the first activity trackers were little more than upgraded pedometers clipped to a waistband or belt to count the number of steps taken by a person. One later activity tracker included a sensor that was inserted into a person's shoe to facilitate counting a number of steps and, if calibrated accurately, could estimate the distance or speed that the person walked or ran. Modern activity trackers may take the form of a smartwatch that may utilize an internal antenna to detect signals from a global positioning system (GPS) to determine a distance that the person has moved, whether that movement is by walking, running, cycling or other manner of moving over a distance from one place to another. The use of a GPS signal provides improved accuracy over large distances. Still, an activity tracker may not be particularly helpful for much more than measuring distances or pace, steps or cadence, duration of exercise, and heart rate.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may comprise calibrating a sensor device to identifying a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may comprise calibrating a sensor device to identify a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

Some embodiments provide a method comprising calibrating a sensor device to identify a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

DETAILED DESCRIPTION

Figure 1:
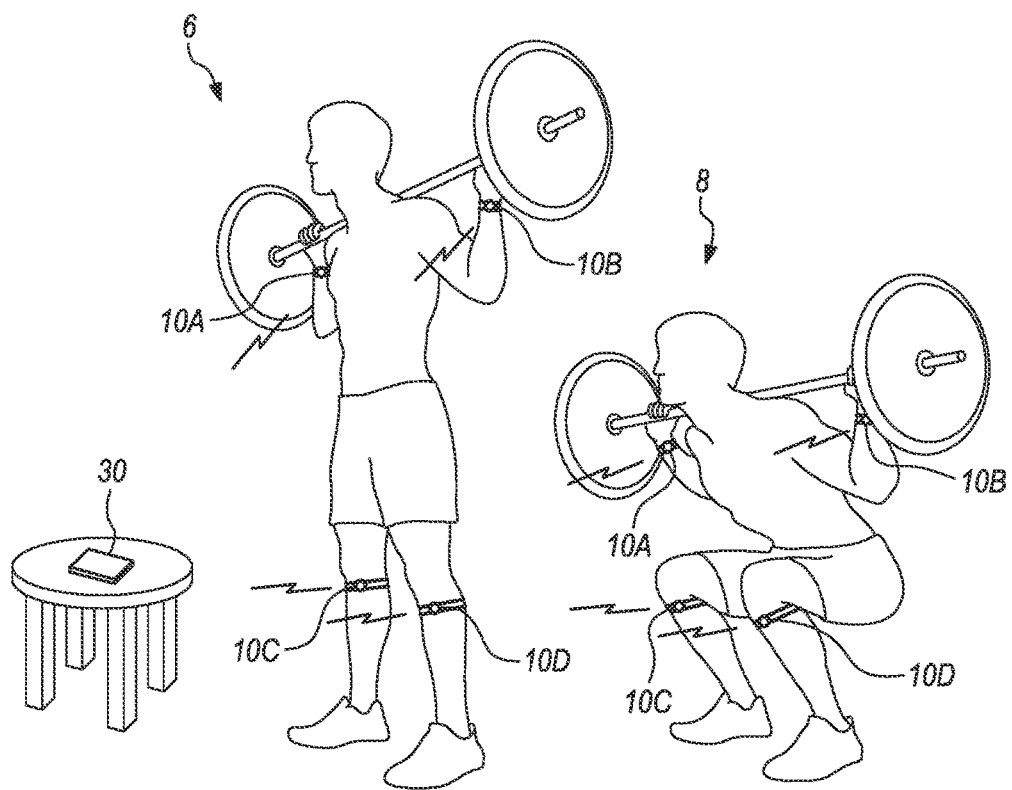
FIG. 1 is a diagram of a person wearing a wearable device while performing an activity in the form of a weightlifting exercise.

Some embodiments provide a computer program product comprising a non-volatile computer readable medium and non-transitory program instructions embodied therein, the program instructions being configured to be executable by a processor to cause the processor to perform various operations. The operations may comprise calibrating a sensor device to identifying a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

A wearable device is an apparatus that may be worn or secured to a person (also referred to herein as a "user" of the wearable device) during the time that the person is performing an activity. For example, a wearable device may be secured to or about a body part, such as an arm, hand, leg, foot, torso, head and/or neck of a person. Each wearable device may be secured to or about the body part a person in any suitable manner. For example, the wearable device may be attached to a strap that is extendable around the body part, the wearable device may be attached to clothing worn by the person, the wearable device may be temporarily adhered to the skin of the person, or the wearable device may be integrated into equipment to be handled by the person. Any number of wearable devices may be worn or secured to the person during the activity. Where multiple wearable devices are used, each wearable device may be worn or secured on a different body part or location and each wearable device may be worn or secured to a body part in the same or different manner.

The wearable device may include any one or more sensors, processors, memory devices, connectivity devices, and/or input/output devices that are currently known or that may be developed in the future. Without limitation, the wearable device may include one or more sensors such as an accelerometer, gyroscope, magnetometer, heart rate sensor, blood pressure sensor and temperature sensor. In one option, the wearable device may include an accelerometer, gyroscope, and/or magnetometer in the form of an inertial measurement unit (IMU). Any one or more of these sensors may automatically generate and/or gather data that can be analyzed to identify a person's specific movement while wearing the one or more sensors. The wearable device may include, without limitation, one or more connectivity devices such as a short-range wireless transceiver, WiFi transceiver, mobile communications transceiver, wireless and/or a global positioning system (GPS) receiver. Still further, the wearable device may include input/output devices, such as a display screen, touchscreen, speaker, microphone, and/or haptics. The wearable device may be a multi-purpose wearable device in the form of a smart watch, a multi-featured fitness tracker, or a dedicated inertial measurement unit for the limited purpose of implementing an embodiment.

An "inertial measurement unit" (IMU) is an electronic device that may be attached to an object for measuring and reporting a specific force, angular rate of movement, and sometimes the orientation of the object. The inertial measurement unit may make these measurements using a combination of accelerometers, gyroscopes, and sometimes magnetometers. An inertial measurement unit may detect linear acceleration using one or more accelerometers and rotational rate using one or more gyroscopes. Some IMUs may also include a magnetometer to provide a direction or heading reference. An MU may contain one accelerometer, one gyroscope, and one magnetometer for each of the three principal axes. The three principal axes may be referred to as pitch (transverse axis or lateral axis), roll (longitudinal axis), and yaw (normal axis) for the gyroscope. Accordingly, an IMU may include a total of three accelerometers, three gyroscopes, and three magnetometers. The IMU may be either a solid-state or microelectromechanical system (MEMS). However, an IMU may include a greater or lesser number of sensors and/or may include additional types of sensors and/or exclude one or more of the mentioned types of sensors.

The terms "calibrate" and "calibrating" refer to a process of determining, perhaps for each sensor, a level of signal output or data values by the sensor in a still state (i.e., in the absence of motion). Accordingly, "calibrating" a sensor device may include determining an average signal level received from a sensor device during a calibration time period and/or determining an amount of offset that may be applied to the signal level in order to "offset" the "still state" signal levels or data values that are a characteristic of the particular sensor. A calibrating function may have a norm point about which the signal level may oscillate when the sensor in a still state. For example, the norm point value may be zero, but the norm point does not have be a zero value. The calibrating function, such as a hardware data calibrator or other portion of the system, may observe a set of uncalibrated signal levels or data values received from the sensor to determine an amount of adjustment (offset) that must occur so that the signal levels will appear to oscillate about the norm. For example, a sensor calibration with a norm of zero (0) may receive uncalibrated data (four data points shown) having values of 3.0, 2.9, 3.1, and 3.0. The calibrating function may determine that, on average, the data values vary or oscillate about an average value of 3.0 away from the norm of zero (0). As a result, the calibrating function may determine that a calibration value (offset) of −3.0 (negative 3.0) should be applied against each data point so that the post-calibrated data will vary or oscillate about the norm. Optionally, the calibrator can continue to monitor the sensor output over time, such as during a calibration period prior to each activity, and determine new calibration values so that the data received from the sensor will always vary or oscillate about the desired norm. The calibration function may also be effective to avoid any cumulative drift in sensor output values experienced over the life of the sensor.

Each independent measurement from one or more sensors may be calibrated in this manner. For example, an inertial measurement unit (IMU) may detect linear acceleration using one or more accelerometers, rotational rate using one or more gyroscopes, and/or a direction or heading reference using a magnetometer. If the IMU includes three accelerometers (i.e., one accelerometer for each of three principal coordinate axis), then the output of each accelerometer may be separately calibrated. In one option, an initial pose of person wearing the IMU may be established as a norm heading direction of 0,0,0 (X, Y and Z axis), such that any change in the pose angles are measured relative to the norm heading direction. Capturing this heading is a form of calibration.

In some embodiments, the activity being performed by a person may be an exercise or the activity may be performed as a business function or a residential chore. Non-limiting examples of an exercise include anaerobic exercise, such as strength and resistance training, and aerobic exercise, such as a running, walking, cycling and swimming. Strength training may include body weight exercises and weightlifting exercise using machine weights and/or free-weights. Body weight exercises may include pushups, chin-ups, sit ups, planks, and yoga. Examples of weightlifting exercises such as bench press, squats, dead lift, and curls. Non-limiting examples of an activity that is a business function may be lifting, carrying and loading boxes or furniture, manufacturing or assembling parts, constructing houses, or working at a computer. Non-limiting examples of an activity that is a residential chore includes pushing a lawn mower, and vacuuming or sweeping a floor. Many of these activities involve a person performing repetitive movements, such that injury can occur if performed with improper form.

The term "form" refers to a specific way of performing a movement as part of an activity, such as a strength training exercise. Many exercises and drills used in fitness, as well as other physical activities in a home or business, may have a recognized way of performing certain movements for the purpose of avoiding injury, maximizing the benefit of the exercise, and/or performing the activity in an efficient manner. In a non-limiting example, proper form may ensure that the movement involves a person's main muscles and avoids over-reliance on the strength of secondary muscles, tendons, ligaments or joints. As any particular muscle fatigues from use, the body may attempt to compensate for the fatigued muscle by recruiting other muscles or muscle groups and transferring force generation to non-fatigued units. This compensation may reduce the potential benefits in muscle strength or muscle size experienced since the muscles may not be worked to failure.

In some embodiments, a processor and memory may be used to analyze data received from the sensors, receive user input from a user, generate output to the user, access data characterizing an activity, and/or store data regarding the performance of an activity. Operations of some embodiments may be performed or executed by a processor in a wearable device such as a smartwatch, a processor in a local computing device such as a smartphone or laptop computer, and/or a processor in a remote computing device such as an application server or cloud computing platform. Analysis of the data received from the sensors may be used to determine a person's form during one or more movement of an activity.

In some embodiments, the processor may provide output to a visual output device such as a display device or screen, an audible output device such as a speaker, or a touch output device such as a haptic unit or element. Non-limiting examples of a display device include a display screen or touchscreen on a wearable device, personal communication device, tablet computer, laptop computer, and/or dedicated apparatus. Non-limiting examples of the speaker include a speaker within the wearable device, personal communication device, tablet computer, laptop computer and/or dedicated apparatus, as well as connected headphones. A haptic element may produce a vibration, force, or pressure. For example, an eccentric rotating mass actuator and/or a magnetic voice coil may produce a vibration, a motor may produce a force, and an ultrasound transducer may produce a feeling or pressure.

In some embodiments, a graphical user interface may be output on a display screen of the wearable device or a computing device other than the wearable device. The graphical user interface may include one or more visual indicator that is formed using data gathered from one or more sensors of the wearable device. The visual indicator may include a chart or graph of the data to provide the user with real-time, near real-time or historical reports including visual cues indicating an effectiveness, consistency, or compliance with a predetermined form of a particular activity. In some examples, the visual indicator may include a model or representation of the user during an activity based upon the sensor data and analysis, and may include a model or representation of a motion or position of the user during the activity. The visual indicator may provide information that the user may use to modify, correct or maintain their form, technique and/or pose for an activity based on the activity type. In some embodiments, any output and/or feedback that may be output as a visual indicator to a user on a display screen may, in addition or as an alternative, be output to a user via a speaker in the form of a voice or other audio output and/or may be output to a user via a haptic element.

In some embodiments, the visual, audible and/or haptic indicator may provide information to the user regarding their form relative to a predetermined ideal form. A memory may store data representing a predetermined ideal form for each of a plurality of activities. Operations may include comparing data representing the user's form during performance of the activity to data representing the predetermined ideal form for performing the same activity. For example, a predetermined ideal form for a squat exercise may indicate that a person performing the squat should move their shoulders (as well as a barbell and hands/wrist holding the barbell on the person's shoulders) perfectly vertically up and down with no forward and backward component of movement and with no side-to-side component of movement. Accordingly, data collected from a wearable device containing a sensor worn on the person's wrist (for example) will indicate the actual form of the person during performance of the squat exercise. A comparison between the data representing the user's actual measured form during performance of the squat activity and the data representing the predetermined ideal form for performing the squat activity may yield a deviation that may be reported to the person. Optionally, any such deviation may be output to the person either as an indication of a magnitude and direction of the deviation or a magnitude and direction necessary for the person to correct the deviation. It should also be appreciated that the same wrist-worn sensors or another wearable sensor on another body part may indicate the range of movement involved in the person's form, which may be too deep (i.e., the range of movement is too far) or insufficiently deep (i.e., the range of movement is not far enough) compared to a predetermined ideal range or depth of movement. So, one visual, audible and/or haptic indicator may inform a person regarding any forward or backward form deviation, another visual, audible and/or haptic indicator may inform a person regarding any side-to-side form deviation, and a further visual, audible and/or haptic indicator may inform a person regarding any range of motion form deviation. It should be further appreciated that other movements during a squat exercise may be measured with an additional one or more wearable devices. For example, a wearable device worn on the person's leg just above or below the knee during the performance of a barbell squat exercise may indicate whether the person's knee is moving too far forward or angling too far to one side relative to a predetermined ideal form for knees while performing a barbell squat.

In some embodiments, a comparison between a measured form during a person's performance of an activity and a predetermined ideal form for the activity may be facilitated by identifying the activity. For example, in order to access the predetermined ideal form for the activity, an operation may identify the activity that is being performed or that will be performed. In one option, the activity may be identified by the person making a manual entry that identifies the activity or selecting the activity from a menu of activities. Such manual identification of the activity is preferably performed prior to performing the activity, but could occur after the activity has been completed. In another option, the activity may be automatically identified by the system by comparing the person's measured movements to a plurality of records that each identify a predetermined ideal form for an activity. The activity for which the predetermined ideal form most closely matches the measured movements of the person may be identified as the activity being performed by the person. Subsequent comparison of the measured form and the predetermined ideal form for identified activity may then be performed as previously described.

In some embodiments, the visual, audible and/or haptic indicator (i.e., feedback) may be provided through visual output, audible output, and/or haptic output either during the activity (i.e., while the person is still performing the activity) or after the activity (i.e., upon completion of the activity or upon request by the person). For example, embodiments may provide real-time or near real-time feedback to the person. Furthermore, the feedback may include some combination of real-time feedback, near real-time feedback, and/or post-activity feedback. In one specific illustration, the feedback may include real-time feedback identifying the user's measured form during the exercise, near real-time feedback identifying any deviation in the user's form relative to a predetermined ideal form for the activity following each repetition of the activity, and post-activity feedback identifying an average pace, average heartrate, and range of deviation in from over the entirety of the activity. In addition to quantitative feedback, embodiments may provide qualitative feedback, such as feedback indicating whether or not the person's heartrate was maintained within a target zone throughout the workout or whether the person's form was within a range of tolerance.

In some embodiments, the visual, audible and/or haptic indicator may be in the form of a notification. For example, the system may cause a mobile device or a wearable device to generate a visual, audible and/or haptic notification when the user has completed a single unit of a particular exercise, such as counting reps, indicating when a user has reached an end point such as a deep enough squat, indicating when a user's motion is on the correct path for the given activity, or indicating that a user's motion has deviated beyond a range from the predetermined ideal form.

In some embodiments, the system may further use the measured movements as input to a user's exercise routine and/or provide the user with output including training insights and recommendations based on the data gathered from the wearable device worn by the user. For example, if a deviation between the person's form and the ideal form for performing squats was initially within a range of tolerance, but with additional repetitions of the squats the deviation between the person's form and the ideal form for performing squats begins to exceed the range of tolerance, then the system may recommend that the person stop performing squats to avoid injury. In one option, the system may provide the person with real-time or near real-time feedback including an extent of deviation from ideal form, then subsequently notify the person to stop performing the activity in response to detecting that the person has not corrected their form within some setpoint number of repetitions following the initial feedback.

Some embodiments provide a technical advantage of providing feedback to a person performing an activity, wherein the feedback identifies how their form deviates from proper form. This feedback may be valuable to the safety of the person and/or to the efficiency or effectiveness of the activity. It is a benefit that this feedback may be provided by a system without requiring the person to always have a friend watch them, a video record them, or a personal trainer or coach present to instruct them. Furthermore, the system may provide more precise measurement or observation, more rapid feedback, and a more complete record of the person's performance of the activity.

In some examples, the systems and methods described herein may enable a user to select different exercise regimens based on their desired outcomes, for example to lose weight, build muscle mass, increase cardio fitness, and other such options. The user selection of the regimen or option may then be used by the system to build or determine an exercise plan to achieve the user's goal. In some examples, this plan may be built from trainer recommendations and may account for the user's personal information such as age, height, weight, and present level of fitness. In some examples, the exercise plans may be pre-built for each option with adjustments available based on the user's personal data, for example with higher intensity workouts for users that are younger and have a higher current level of fitness. The systems may present exercise plans and routines to the user showing what the user should do throughout each exercise as well as showing, in real-time or near real-time, the user's compliance with the exercise plan. In one option, the user may view a side-by-side view of the form the user should strive for next to a view of a representation showing the form the user has during the exercise. This enables a user to adjust their form and technique without the need of an in-person trainer.

In some embodiments, the systems and methods described herein may provide a platform through which a user can interact with a trainer who provides exercise plans. For example, the user may grant the trainer access to data collected and analysis generated during performance of one or more activities. The trainer may then access the data and analysis to consider the person's performance of the activity without having to be with the person at the same place and time that the activity is being performed. The cost and reluctance of users to work with a trainer may be reduced if the users are able to interact with a trainer over a platform from the comfort of the users' own home rather than attending a typical athletic facility. The trainer may provide exercise plans as provided above and may review data from completed exercise sessions to provide additional feedback to the user on how they can improve or what they can work on to further improve.

The foregoing computer program products may further include program instructions for implementing or initiating any one or more aspects of the methods and operations described herein. Accordingly, a separate description of the methods will not be duplicated in the context of a computer program product, or vice versa. Similarly, embodiments that are described in terms of a computer program product may also be implemented as a method of performing the operations and/or a system for performing the method or computer program product.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may comprise calibrating a sensor device to identify a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

Some embodiments provide a method comprising calibrating a sensor device to identify a three-dimensional frame of reference, wherein the sensor device includes an inertial measurement unit, receiving three-dimensional motion data from the sensor device secured to a body part of a person as the person performs an activity involving movement of the body part, and causing generation of output based on the three-dimensional motion data, wherein the output is based on the movement of the sensor device.

FIG. 1 is a diagram of a person wearing wearable devices 10A-D while performing an activity in the form of a weightlifting exercise known as a barbell sqaut. A first two of the wearable devices 10A, 10B are secured or worn about the person's left and right wrists and a second two of the wearable device 10C, 10D are secured or worn about the person's left and right legs just below the knee. Each of the wearable devices 10A-D includes a sensor device including an inertial measurement unit. Embodiments may be implemented with fewer wearable devices, such as a single wearable device, or additional wearable devices. Embodiments may also be implemented with one or more wearable devices secured in the locations shown and/or in other locations, such as the torso, thighs, biceps, elbows, and the like.

In FIG. 1, the person may begin the barbell squat in a first pose 6. The sensors in the wearable devices 10A-D are paired, or otherwise in communication, with a computing device 30, which may be a smartphone. During setup, the person may indicate to the computing device 30 that a first wearable device 10A is being worn on a right wrist of the person, a second wearable device 10B is being worn on a left wrist of the person, a third wearable device 10C is being worn on a right leg below the knee of the person, and a fourth wearable device 10D is being worn on a left leg below the knee of the person. This information may be manually input or provided through some other interaction, such as a prompt from the computing device 30 and a response involving the person moving in a corresponding manner.

In some embodiments, the person may identify the intention to perform a barbell squat to the computing device 30, such as with a manual entry through a menu system, a voice command, or by simply performing the barbell squat and allowing the computing device 30 to identify that the person is performing a barbell squat. In one option, the person may hold still in the first pose 6 for a predetermined duration to allow the computing device 30 to calibrate the sensors in the wearable devices 10A-D with respect to a frame of reference or coordinate system for the pose 6. Then, the person may begin performing the barbell squat by moving between the first pose 6 and a second pose 8. Although the second pose 8 is illustrated to the right of the first pose 6, it should be understood that a barbell squat is performed with the feet remaining in a set position.

The inertial measurement unit in the wearable devices 10A-D wirelessly communicate with the computing device 30 during calibration and performance of the barbell squat. Accordingly, the wearable devices 10A-D each transmit various data, such as their heading, angular acceleration, change in velocity, magnetometer data and timestamp data, as each wearable device moves along with the body part to which the wearable device is secured. This three-dimensional motion data is received by the computing device 30 and is analyzed according to one or more embodiment. As described herein, the computing device 30 may also generate output to the person, such as a display, audio or a haptic. For example, if one or more of the wearable devices 10A-D has haptic components, the computing device 30 may cause the wearable device to take one or more haptic actions, such as vibrating the wearable device 10A on the right wrist to indicate that person is leaning to the right and cause the person to correct their posture accordingly.

Figure 2:
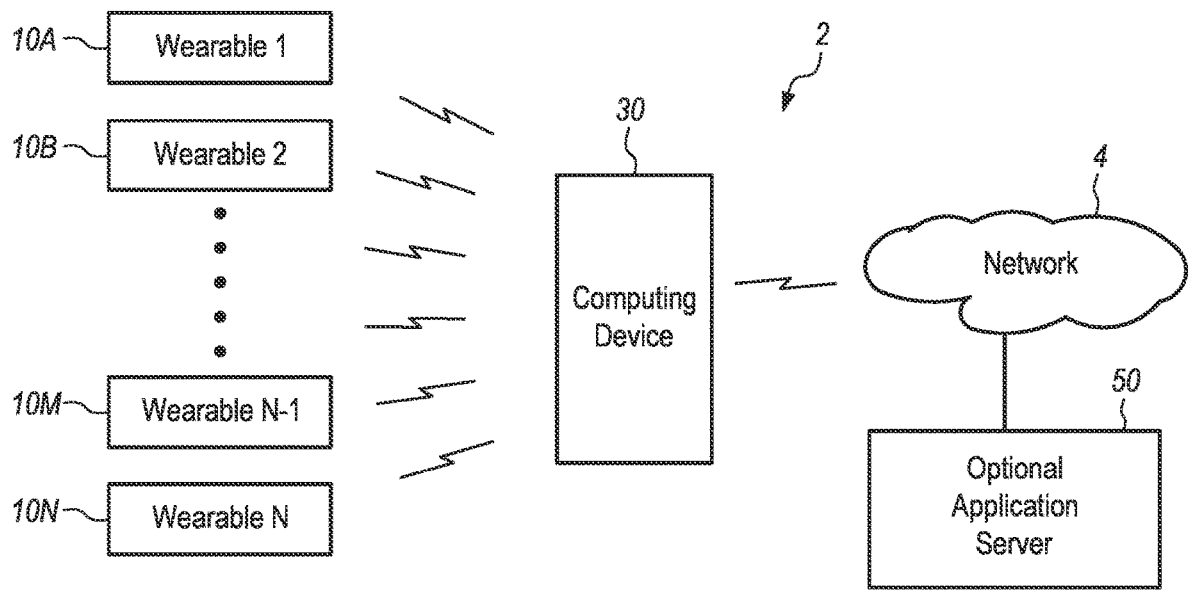
FIG. 2 is a diagram of a system for monitoring movement of a person performing an activity and providing feedback to the person regarding their movement.

FIG. 2 is a diagram of a system 2 for monitoring movement of a person performing an activity and providing feedback to the person regarding their movement. The system 2 includes one or more wearable devices 10A-N in wireless or direct communication with a computing device 30, which may be a local computing device or a mobile communication device located near the wearable devices. It is also possible for the computing device 30 to be a wearable device. In one option, the computing device 30 may also communicate with an optional application server 50 over a network 32, such as the Internet. The computing device 30 may communicate wirelessly to a network access point within the network 4 using the WiFi protocol. When utilized, the optional application server 50 may perform some of the operations of one or more embodiments in communication with the computing device 30.

Figure 3:
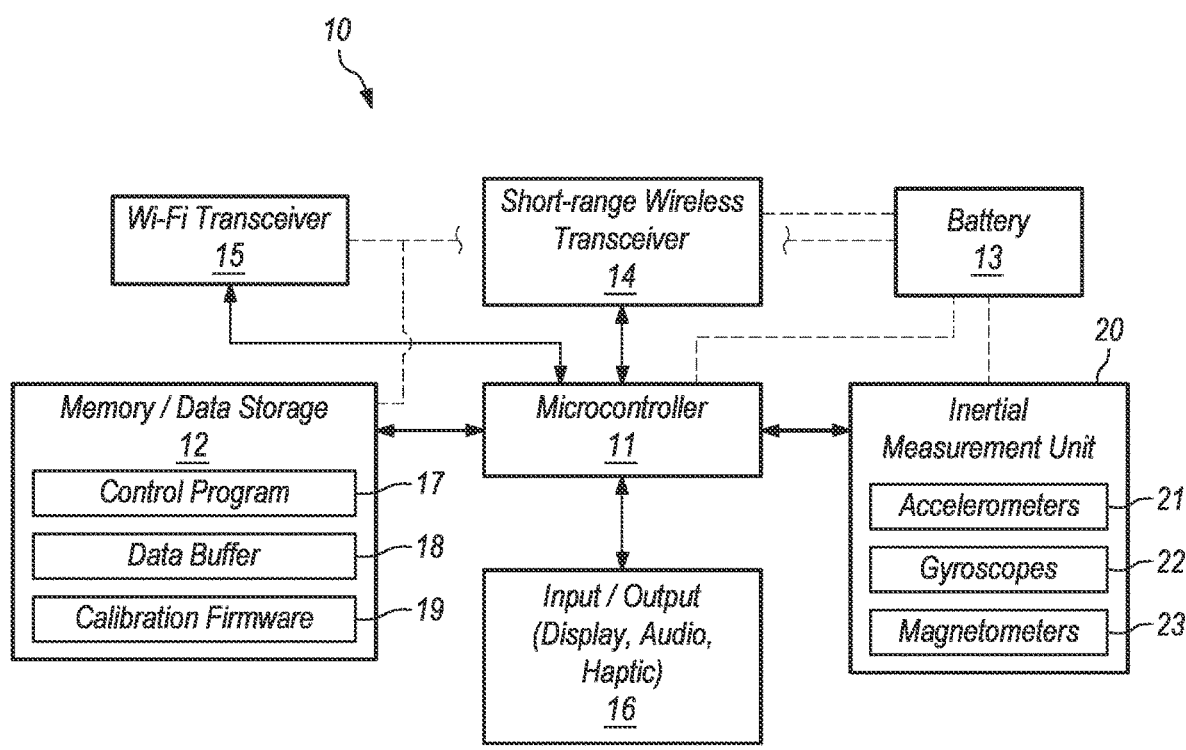
FIG. 3 is a diagram of a wearable device including inertial measurement unit (IMU).

FIG. 3 is a diagram of a wearable device 10 including an inertial measurement unit (IMU) 20. For example, the wearable device 10 may be a smart watch, fitness tracker, or other wearable sensor device. The wearable device 10 may include a microcontroller/processor 11, memory 12, a battery 13 or other power source, a short-range wireless transceiver 14 (perhaps Bluetooth), a Wi-Fi transceiver 15, and one or more input/output component(s) 16 (i.e., display, audio speaker, and/or haptic device) or other functionality. The battery/power source 13 provides power to each of the other components and may allow the wearable device 10 to be mobile. The microcontroller/processor 11 may access the memory 12 to read and/or write data and/or program instructions, and may control use of the short-range wireless transceiver 14, the Wi-Fi transceiver 15, and the input/output component(s) 16. The memory 12 may include a device control program 17 including program instructions that may be executed by the microcontroller 11 to cause the performance of various operations. The memory 12 may also provide a data buffer 18 and calibration firmware.

The inertial measurement unit (IMU) 20 is an electronic device that may measure and report a specific force, angular rate of movement, and sometimes the orientation of the wearable device 10. The inertial measurement unit may make these measurements using a combination of accelerometers 21, gyroscopes 22, and sometimes magnetometers 23. An inertial measurement unit may detect linear acceleration using one or more accelerometers and rotational rate using one or more gyroscopes. Some IMUs may also include a magnetometer to provide a direction or heading reference. An IMU may contain one accelerometer, one gyroscope, and one magnetometer for each of the three principal axes. The three principal axes may be referred to as pitch (transverse axis or lateral axis), roll (longitudinal axis), and yaw (normal axis). Accordingly, an IMU may include a total of three accelerometers, three gyroscopes, and three magnetometers. The IMU may be either a solid-state or microelectromechanical system (MEMS). A non-limiting example of an inertial measurement unit is included as a component of a wearable device referred to as the XSENS DOT, which is available from Xsens Technologies B.V.

Figure 4:
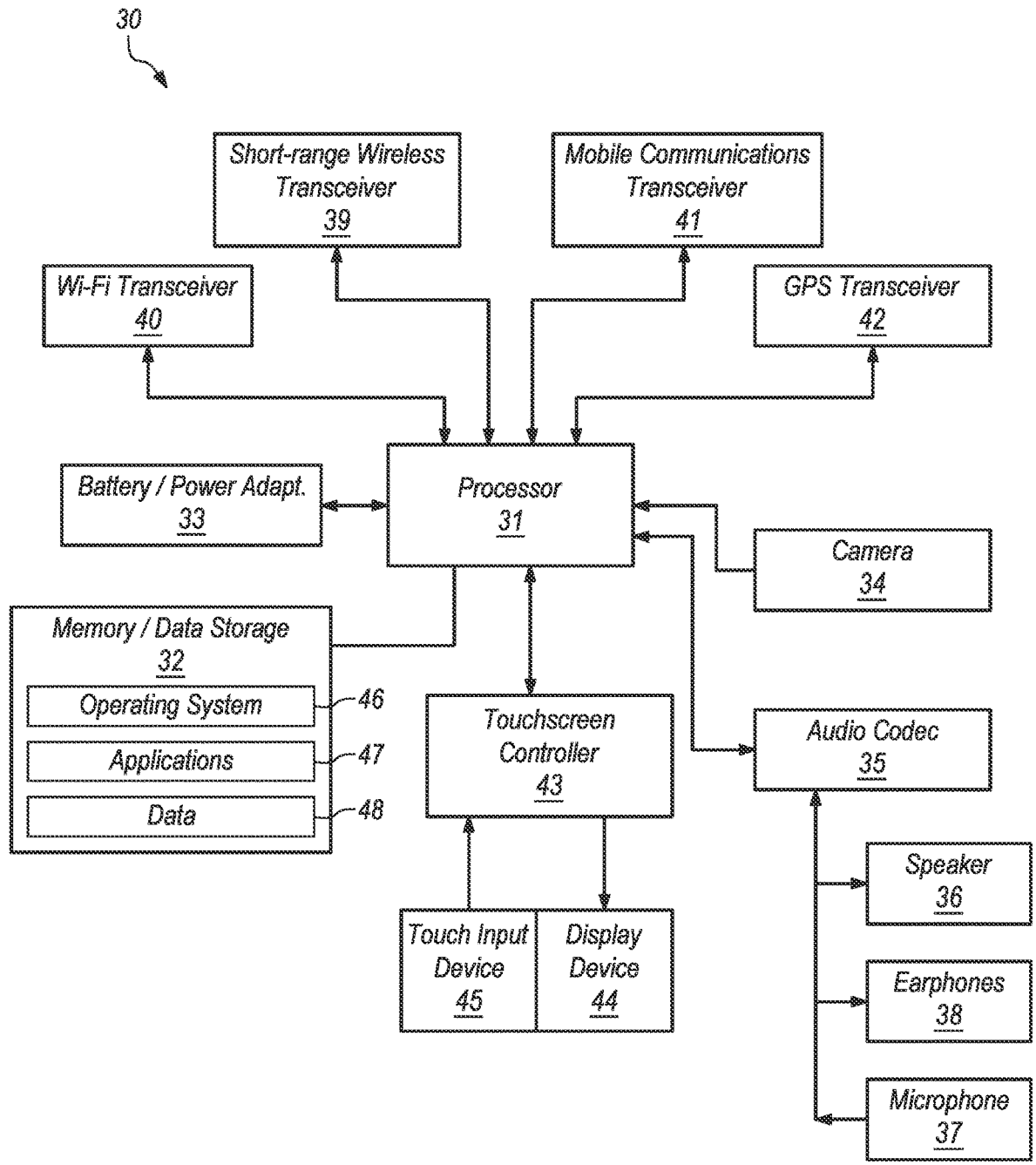
FIG. 4 is a diagram of a local computing device that may communicate with the wearable device.

FIG. 4 is a diagram of a local computing device 30, such as a smartphone or laptop computer, that may communicate with the wearable device 10. The computing device 30 may include a processor 31, memory or data storage device 32, a battery (or other power source) 33, a camera 34, and an audio codec 35 coupled to a built-in speaker 36, a microphone 37, and an earphone jack 38. The computing device 30 may further include a touchscreen controller 43 which provides a graphical output to the display device 44 and an input from a touch input device 45. Collectively, the display device 44 and touch input device 45 may be referred to as a touchscreen.

The computing device 30 may also include a short-range wireless transceiver 39, a wireless local area network transceiver ("Wi-Fi transceiver") 40, a mobile communication transceiver 41 for communication with a cellular communication network, and a global positioning system (GPS) transceiver 42. In one example, the short-range wireless transceiver 39 may support a paired connection with one or more wearable device and the Wi-Fi transceiver 40 may support a wireless local area network connection with a Wi-Fi access point to the network 4.

The memory 32 may store one or more applications including program instructions that are executable by the processor 31. Such applications may include an operating system 46 and applications 47 that include program instructions that cause the processor 31 perform the operations of one or more embodiments. The memory 71 may also store data 48 that may include three-dimensional motion data received from the wearable device(s), predetermined form data for each of a plurality of activities, and identifying data for each of the wearable devices.

Figure 5:
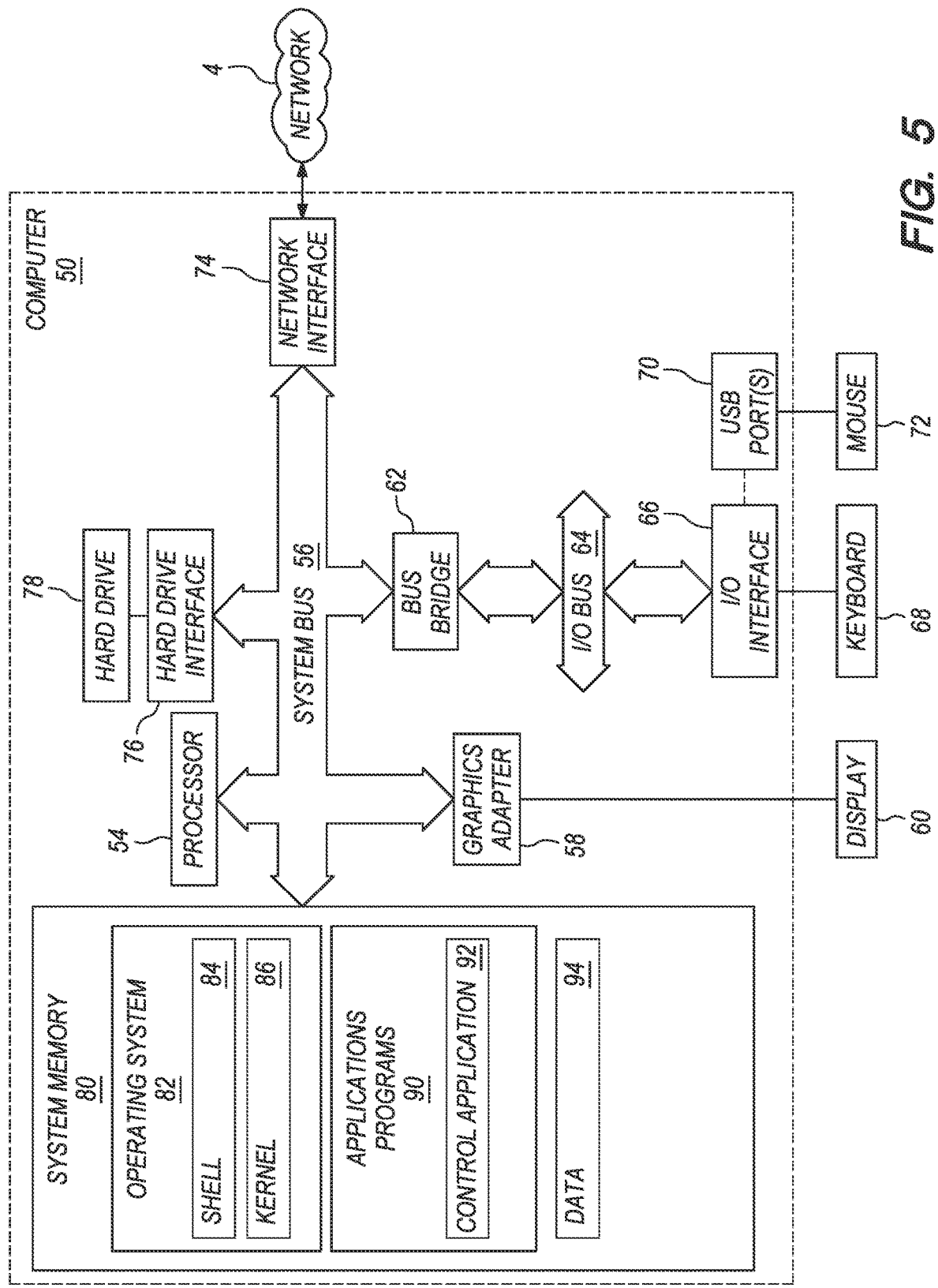
FIG. 5 is a diagram of a server that may communicate with the local computing device.

FIG. 5 is a diagram of a computer 50 that may communicate with the local computing device. The computer 50 may also be representative of the architecture or configuration of a server or other local computing device. The computer 50 includes a processor unit 54 that is coupled to a system bus 56. The processor unit 54 may utilize one or more processors, each of which has one or more processor cores. A graphics adapter 58, which drives/supports the display 60, is also coupled to system bus 56. The graphics adapter 58 may, for example, include a graphics processing unit (GPU). The system bus 56 is coupled via a bus bridge 62 to an input/output (I/O) bus 164. An I/O interface 66 is coupled to the I/O bus 64. The I/O interface 66 affords communication with various I/O devices, including a keyboard 68 (such as a touch screen virtual keyboard), and a USB mouse 72 via USB port(s) 70 (or other type of pointing device, such as a trackpad). As depicted, the computer 50 is able to communicate with other computing devices via the network 4 using a network adapter or network interface controller 74. For example, the computer 50 may communicate with the application server 50 shown in FIG. 2.

A hard drive interface 76 is also coupled to the system bus 56. The hard drive interface 76 interfaces with a hard drive 78. In a preferred embodiment, the hard drive 78 communicates with system memory 80, which is also coupled to the system bus 56. System memory is defined as a lowest level of volatile memory in the computer 50. This volatile memory may include additional higher levels of volatile memory (not shown), including, but not limited to, cache memory, registers and buffers. Data that populates the system memory 80 may include an operating system (OS) 82 and application programs 90. The hardware elements depicted in the computer 50 are not intended to be exhaustive, but rather are representative. For instance, the computer 50 may include non-volatile memory and the like.

The operating system 82 includes a shell 84 for providing transparent user access to resources such as application programs 90. Generally, the shell 84 is a program that provides an interpreter and an interface between the user and the operating system. More specifically, the shell 84 executes commands that are entered into a command line user interface or from a file. Thus, the shell 84, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 86) for processing. Note that while the shell 84 may be a text-based, line-oriented user interface, embodiments may support other user interface modes, such as graphical, voice, gestural, etc.

As depicted, the operating system 82 also includes the kernel 86, which may include lower levels of functionality for the operating system 82, including providing essential services required by other parts of the operating system 82 and application programs 90. Such essential services may include memory management, process and task management, disk management, and mouse and keyboard management. As shown, the computer 50 includes application programs 90 in the system memory 80 of the computer 50, including, without limitation, a control program 92 including program instructions that may be executed by the processor 70 to cause the performance of various operations according to embodiments disclosed herein. Still further, the computer 50 may include data 94 stored in the system memory 80 and/or on the hard drive 78, including, without limitation, the predetermined form data, user accounts, personal trainer account, historical activity records, and the like.

Figure 6:
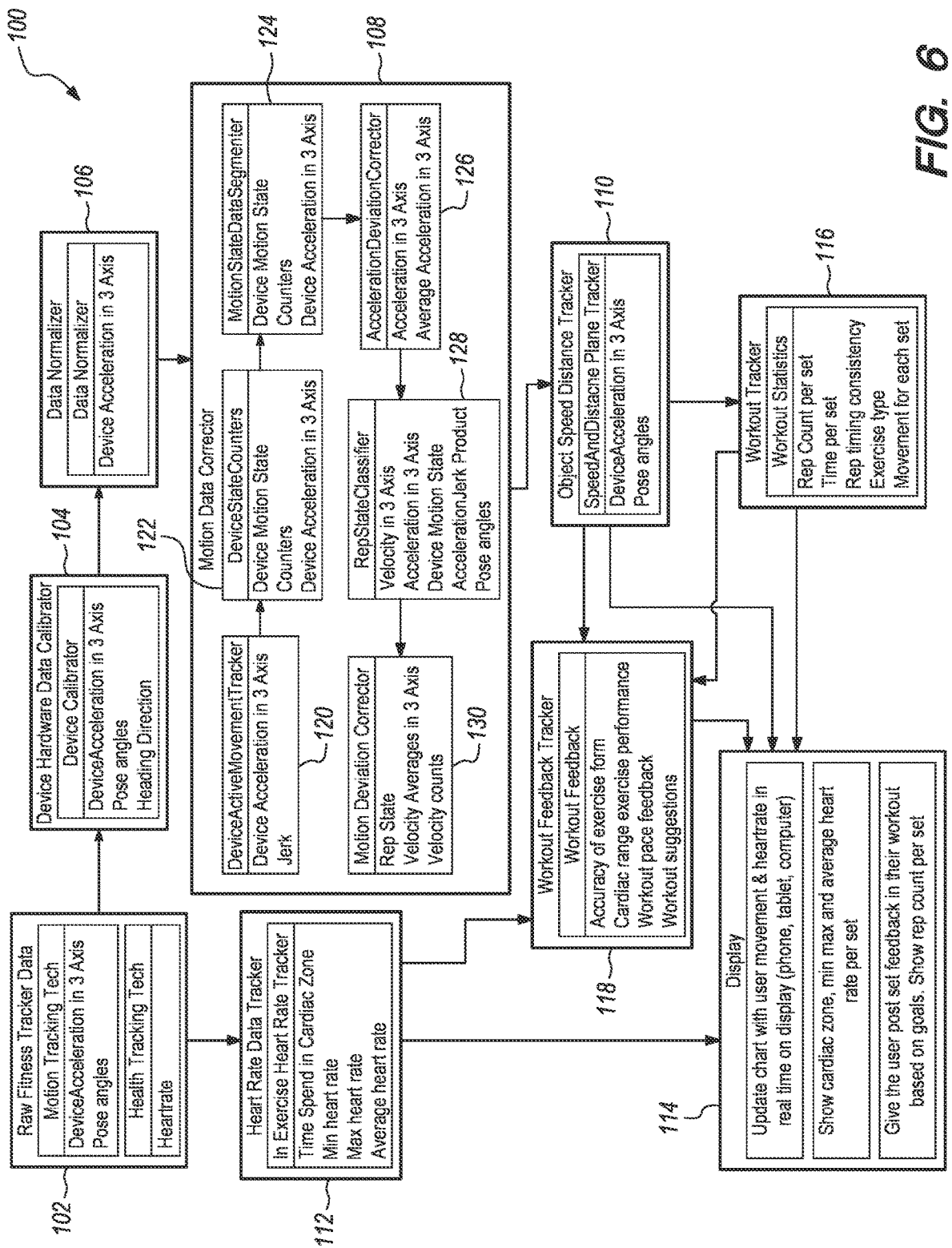
FIG. 6 is a flowchart of operations performed with data from the wearable device.

FIG. 6 is a block diagram of various software modules of a control application 100 including operations performed with data from the wearable device 10 (see FIGS. 1-3). The block diagram illustrates dataflow between the modules according to various embodiments. The software modules may be implemented by one or more computing systems, such as the wearable device 10 of FIG. 3, the computing device 30 of FIG. 4, and/or the computer or server 50 of FIG. 5. Certain of the modules or portions of the modules may be performed any of the computing systems 10, 30, 50.

Module 102 receives raw three-dimensional motion data from a wearable device, such as a fitness tracker. The raw data may include motion tracking data, accelerometer data in three dimensions or planes, pose angles, as well as health tracking data such as heartrate, height, weight, blood pressure, or other such user health and physical data, some of which may be entered manually by the user. In one embodiment, the data collected by the wearable device and provided to the raw fitness tracker data module 102 includes acceleration in three dimensions, magnetometer data and pose angles (gyroscope data). The wearable device may perform some internal computations on the collected data so that the wearable device may transmit the data at a frequency that can be handled by the current Bluetooth short range wireless signal standard. For example, the inertial measurement unit (IMU) chipset may perform internal computations to compress the data that is collecting at a high frequency, such as about 800 Hertz, to a lower frequency, such as about 60 hertz, so that the data transmission can be supported via Bluetooth. In one option, one or more wearable device may include a photoplethysmography (PPG) device or similar component for measuring a heart rate of the person. However, the amount of data that can be transmitted via a Bluetooth connection may be limited, such that any or all of the data collected may or may not be compressed to a greater or lesser extent to conform with the limitations of the current state of short range wireless technology and then output to the computing device.

Module 104 is a device hardware data calibrator that calibrates the raw data received from the wearable device. The device hardware calibrator may be a software element that uses the raw data from the wearable device to generate calibrated information indicating the acceleration of the fitness tracking device and the pose angles of the device in space based on the raw data. The purpose of a calibration for these devices is to reduce or normalize any natural drift or offset that each component of the IMU chipset may possess from norm. This calibration may be done at the start of the run and continue as the device is in use to account for environmental impacts on the system. These environmental impacts may include magnetic fields changes in internal resistance amongst components or even drops in power from the battery. A heading may be imposed on or captured by the wearable device so that all data is normal relative to the user's perspective orientation. This is done by establishing an orientation as normal to the user and storing this orientation as the users heading orientation. Once the heading is established, all rotation matrix or algorithm adjustments, which occur as the device rotates, are performed with the established heading orientation as the defined norm. This allows the established orientation to define forward, backward, left, and right from the user. The z axis, also referred to as up and down, is unaffected by a heading adjustment as it is not affected by what direction the user is facing.

In FIG. 6 the device hardware data calibrator 104 indicates that a "heading direction" and "initial acceleration data" are input to the device calibrator to obtain output in the form of "calibrated data". This calibrated data has been adjusted to have reduced drift and offset from the calibrating system within the device. The device will also adjust acceleration and pose angles so that this data is representative of the perspective of the established heading direction. The acceleration data will have reduced drift and offset from zero and it will also have been adjusted to be representative of the users established heading direction. The pose angles may be adjusted to be representative of the users established heading direction. Calibration may be done at various times within the system, such as during a calibration period just prior to beginning an activity. Calibration may be performed to normalize the data because the IMU may not produce a perfect signal.

The calibration algorithm removes any natural sensor bias and returns the base signal down to zero or to the lowest achievable state. For example, the inertial measurement unit (IMU) may naturally have a still state (i.e., no actual movement) wherein the output signal indicates 0.02 g acceleration and the algorithm will apply a –0.02 g correction to all data points so that the output of the IMU is zero when the IMU is still.

Module 106 is a data normalizer that receives the calibrated motion data and calibrated pose angles (Euler angles) from the device hardware data calibrator 104 and corrects the motion data to account for errors in the data. Such errors may include noise, drift, data spikes, and other such abnormalities in the data. Specifically, the data normalizer 106 may input the calibrated data from the device calibrator 104 into a series of three algorithms: (1) secondary orientation correcting algorithm, (2) acceleration averaging algorithm, and (3) frequency filter.

First, the secondary orientation correcting algorithm converts the acceleration vectors (i.e., the acceleration values/magnitudes in the x, y and z directions) so that they are normal to the heading of the device. This secondary orientation correction is necessary if the initial heading algorithm has any errors within the calculation. Accordingly, the secondary orientation correcting algorithm functions as a back up to the heading algorithm in the "Data Calibrator". This may not be necessary depending on the method used in the data calibrator. The normalized acceleration vectors are then input to an acceleration averaging algorithm.

The acceleration averaging algorithm smooths the acceleration data by reducing spikes that may be exhibited in the raw data. For example, the averaging algorithm may output a 10-data point rolling average, where a new data point is included in the 10-data point average as the oldest data point is dropped from the 10-data point average. Accordingly, the averaging algorithm replace every data point with the average of the 10 previous data points.

The averaged acceleration data is then input to a frequency filter which passes signals with a frequency lower than a selected cutoff frequency and attenuates signals with frequencies higher than the cutoff frequency. Accordingly, the output of the frequency filter is a signal that is based on the data that has local frequencies within the specified allowable range. This may be executed by implementation of a Butterworth equation that results in a filtered data signal based on a Butterworth equation, the averaged data signal and recently generated data points. For example, if the defined frequency range is from 0.5 hertz to 1.5 hertz then the output data will have local frequencies with a frequency no less than 0.5 hertz and no greater than 1.5 hertz. The Butterworth filter may have a set window size, such as 3 data points. The Butterworth filter will look at the 3 data points and if the data has a local frequency indicative of 2 hertz, then the values of the data points in the window will have a lessened impact on to the generated signal to maintain a local frequency of about 1.5 hertz and the generated data point will replace the oldest data point in the sliding window. This adjusts the magnitudes of data point points so that the impact of noise is dramatically decreased within the system. Without the data normalizer module 106, the data may include too much noise or irregularity to accurately track and model the pose and motion of the wearable device. Depending on the quality of the signal provided from the wearable device, various components of the data normalizer may be chosen to be omitted from the final system.

In some embodiments, the frequency filter may be selected from a Butterworth filter, a Chebyshev Type 1 filter, and/or Elliptical filter. Some embodiments may use one frequency filter, but other embodiments may use more than one frequency filter such that the output of one algorithm may be used to verify the output of the other algorithm. The Kalman filter rotates the vector accelerations as the IMU rotates in order to match the heading initially established for the IMU before the person begins the activity. The secondary orientation algorithm ensures that the directional vectors are correctly projected as the IMU rotates. The secondary orientation algorithm may be superior to the Kalman filter and may provide a more accurate directional acceleration vector. For example, if the IMU were to rotate, all accelerations would remain in the direction of actual motion.

The Butterworth filter is used to perform a frequency adjustment on the data to ensure that only data of the desired frequency range is able to pass through to the rest of the system. For example, if motion data changes quickly in a different direction, that data will be adjusted until it has an acceptable frequency defined by the Butterworth filter. However, if the data collected has a behavior of about 1 hertz (Hz), then the data is most likely real data so the data passes through the filter as long as it is within the specified range of the filter. Optionally, a correction may be made to the data point so that the data point matches the specified frequency range.

Module 108 is a motion data corrector that receives the motion data and pose angles from the data normalizer. The motion data may include any data that describes the motion of the wearable device though space, such as the output from the Butterworth filter or other similar algorithm. Accordingly, the motion data may include acceleration, velocity, displacement, jerk and a variety of measurements whether or not they have been filtered. The pose angles describe the orientation of the wearable device in space and may be described as Euler angles, quaternions, or other orientation method. After receiving the motion data and pose angles, the motion data corrector 108 may then isolate the relevant movement data and adjusts the data to reflect the actual behavior of the wearable device. If the data is not corrected, the magnitude of the movements would not be an accurate representation of the movement of the wearable device. The motion data corrector module 108 may include six submodules or tasks, including a device active movement tracker submodule 120, a device state counters submodule 122, a motion state data segmenter submodule 124, an acceleration deviation corrector submodule 126, a repetition state classifier submodule 128, and a motion deviation corrector submodule 130.

The device active movement tracker submodule 120 determines whether the device is in motion, still, or is experiencing nonrelevant jitter within the IMU in the wearable device. A "still state" (i.e., no motion) of the wearable device is determined in response to a motion state value that may be determined by a lack of jerk and acceleration having values that are within a predetermined range. The predetermined range may be a fixed preset range that is determined to most likely mean that the sensor has stopped motion and should be categorized as "is still." The simplest motion state value is the product of the acceleration magnitude multiplied by the jerk magnitude. Both the acceleration magnitude and the jerk magnitude may be separately calculated using the equation $S=(X^2+Y^2+Z^2)^{0.5}$. Other similar motion state values may be used as equivalent units such as, but not limited to, change in velocity (dV), change in angular velocity (dQ) and snap (i.e., the derivative of jerk with respect to time). The predetermined ranges for the jerk and acceleration are determined by a sensitivity that the system intends to operate above. As used herein, the term "jerk" refers to the mathematical derivative of acceleration with respect to time, such that jerk has the units of distance divided by time cubed (i.e., meters/second$^3$). For instance, if the predetermined range of acceleration values was set to 0.0 to 0.3, then slow acceleration may be difficult to capture since the motions with jerk and/or acceleration within this predetermined range will be categorized within the "still state" threshold. An "in motion state" of the wearable device may be determined by the inverse of the conditions that the system uses to determine an "is still" state. In other words, if the jerk and/or acceleration values are outside the predetermined range for an "is still" state, then the motion is categorized as having an "in motion state". Accordingly, the device active movement tracker submodule 120 ensures that irrelevant jitter is not classified as "in motion state" by establishing a confidence condition that requires at least a minimum magnitude or duration of the motion before concluding that the data indicates an "in motion state". If the device active movement tracker submodule 120 determines that the motion data is below the threshold (or within the predetermined range for still motion), then the motion is treated as irrelevant jitter, which leads to nullifying the data and classifying the motion batch as "is still"

For example, at the beginning of a workout, motion of the wearable device is low (i.e., within the predetermined range) and should be in a "still state," and once the person begins to perform the activity then accelerations of the wearable device will increase (i.e., above the upper limit of the predetermined range) and the system should determine that the wearable device is an "in motion state." The device active movement tracker submodule 120 may also determine if the device is in relevant motion ("in motion state") or irrelevant motion ("still state"). Making a determination between these two states facilitates accurate corrections in operations of other submodules. The device active movement tracker submodule 120 can perform state classification to the system without performing any drift corrections to the data which previously would only be possible with machine learning models. The device active movement tracker submodule 120 performs the state classification using the foregoing confidence condition to determine whether or not the data set has sufficient magnitude or duration of data to be considered "in motion."

The device state algorithm of the device active movement tracker submodule 120 may determine a motion state (or device state) by calculating a value (acceleration scalar times the combination of the jerk vectors) and comparing the calculated value to a predefined threshold value. For example, when an IMU is in the "still state" (i.e., not moving), both acceleration and jerk are low such that the device state algorithm outputs a small value. When the IMU begins to move, the amount of jerk will increase such that the device state algorithm outputs a greater value. The value of the output of the device state algorithm identifies whether the IMU is in the "still state" or the "in motion state." For example, the device state algorithm may output a Boolean value of "0" or "False" if the IMU is still (i.e., not moving) and may output a Boolean value of "1" or "True" is the IMU is in motion.

In one example of the device state algorithm, it is determined whether the following equation is true (i.e., the IMU is in motion) or false (i.e., the IMU is still):

$$(X^2Y^2+Z^2)^{1/2} \times (x^2+y^2+z^2)^{1/2} \geq SP$$

where:
X is acceleration in the direction of the x-axis;
Y is acceleration in the direction of the y-axis;
Z is acceleration in the direction of the z-axis;
x is jerk in the direction of the x-axis;
x is jerk in the direction of the y-axis;
x is jerk in the direction of the z-axis; and
SP is a setpoint value (such as 0.2).

The device state counters submodule 122 may include a series of counters to monitor a span of data collections (i.e., a series of data points) and to monitor the "still state" occurrences. As mentioned earlier, motions must satisfy a confidence condition of either magnitude or duration to be classified as "in motion." The device state counters serve to verify that the motion state classification condition has been met and is used in a number of calculations in the acceleration deviation corrector submodule 126 and the motion data corrector 130. In one example of an "in motion" counter, when a motion span begins (i.e., device active movement tracker 120 generates an initial instance of an "in motion state" following a "still state"), the device state counters submodule 122 will ensure that the data is related to relevant motion by counting a number of consecutive nonzero data points (i.e., counting "in motion state" data points; perhaps having a Boolean value of "1" or "True") that are coming out of the device active motion tracker 120, or a number of consecutive jerk and/or acceleration values above the "in motion state" threshold (i.e., not within the predetermined range of values for a "still state"). An example of a "still state" counter counts the number of consecutive zero data points (i.e., counting "still state" data points; perhaps having a Boolean value of "0" or "False"), or the number of consecutive jerk and/or acceleration values below the "in motion" threshold (i.e., within the predetermined range of values for a "still state"). An additional example is a "return to still" counter, which counts the number of data points below the threshold in a smaller window (i.e., fewer data points are necessary) to reach a determination that the device has a "return to still state". Once an "in motion state" has been triggered, the "in motion" counter counts each data point until a "return to still state" has been triggered. These counters allow the data motion corrector module 108 to confidently start or stop movement data sets in later operations as well as perform necessary algorithms in the corrector submodules 126 and 130.

To confidently determine an "in motion state", some embodiments of the device active motion tracker 120 may require a set number of data points within a sliding window (such as 25 data points out of a 30 data point sliding window; starting with the first data point that is "in motion" following a "still state") to be above the defined motion state threshold. While the output of the counters is provided to the motion state data segmenter 124, it may be the motion state data segmenter that triggers when one of the counters should stop. For example, the motion state data segmenter may determine that a "return to still state" condition has been triggered and instruct the "in motion state" counter to stop counting.

The motion data corrector 108 may also separate or isolate groups or series of data points that define a discrete motion. For this purpose, a motion state data segmenter submodule 124 may use the device state, rolling counters and the accelerations to create an array of data that is representative of a motion. A motion may be defined as starting with the first data point with "in motion state", have a determined adequate motion span or magnitude and have an ending with an "is still" determination. Each data point may include acceleration data, pose angle data, the device state (i.e., "is still", "in motion") and the output of the counters. All determinations may have an algorithmic method of motion validity which may be in the form of a machine learning model, a threshold algorithm, logic algorithm, or a combination of the former. An example of this determination is a counter observing a window of data points with values below a motion threshold that would lead the system to determine that the device is now "still" (no motion) and would trigger the event of "is still". This array of data representative of a motion is the uncorrected data set that will be adjusted in a later operation to remove the present sensor bias and data skews. The data may be sent to the rest of the system as an array, being analyzed and adjusted as a group (i.e., separate from the data associated with other previous or subsequent motions). For example, motion is detected or identified by the device active movement tracker submodule 120 and validated by the device state counters submodule 122. The purpose of the motion state data segmenter submodule 124 is to then group/batch together validated accelerations and pose angle data and then send the grouped/batched data to the remainder of the motion data corrector module 108 while all other still data is represented as "still" (i.e., not included in a motion data group).

The motion data corrector module 108 may also perform a series of corrections to the grouped/batched data in order to better allow the data to enter the repetition state classifying submodule 128. An acceleration deviation corrector submodule 126 may balance the velocities in the data by adjusting the acceleration array values by a fixed amount determined for the specified array of data. The average acceleration during a motion may be subtracted from the acceleration value in each data point in the array. By removing the average acceleration from the velocity's derivative (i.e., acceleration value) all velocities are ensured to start and end at zero (i.e., no velocity). In this manner, the acceleration deviation corrector submodule 126 ensures that all of the identified motions start from rest (i.e., a "still state") and end at rest (i.e., a "still state"). Most motion data, if uncorrected, could end with a non-still state velocity at the end of a motion and this acceleration deviation corrector submodule 126 performs an adjustment to ensure a still velocity at the end of a motion.

The repetition state classifier submodule 128 correctly categorizes motions that have been batched or grouped, such as a half repetition, eccentric repetition, concentric repetition, full repetition and a variety of other repetition states. The repetition state classification is performed after the data has been segmented into motion batches so that the correct algorithm may be used for the final correction of the motion data. In this context, the term "repetition" refers to a specific movement of an exercise or activity. This determination of a repetition state may allow the system to select the correct adjustment to the data in submodule 130. The repetition state classifier submodule 128 may also be used in tracking repetitions in the movement, as well as the pace of the exercise. For example, a user may perform the initial motion of a bench press (i.e., raise the barbell) and then a second motion of the bench press to complete the repetition (i.e., lower the barbell). The initial motion causes the repetition state classifier submodule 128 to output an eccentric state and then the second motion causes the repetition state classifier submodule 128 to output a concentric motion.

The repetition state classifier submodule may include a machine learning algorithm that analyses the data within the group of data representing a motion, and may then categorize the group of data to a repetition state that is the most similar to the data set. For example, if the IMU were to move forward and then stop, it would be expected that the acceleration value would go up and then down and then stop. The machine learning algorithm may then categorize the repetition state of this motion as an eccentric motion or half repetition based on the information that the machine learning algorithm knows from when the model was trained.

A machine learning model may compare a new data group to various training data groups to determine which training data group is the most similar to the new data group. Accordingly, the new data group may be categorized as being of the same type of repetition or motion. Typically, after a machine learning model is built, the model is trained by defining each of the groups that you would like the machine to learn to identify. For example, if you want the machine learning model to identify A, B, and C, the model is provided with examples of A, B, and C. These examples train the machine learning model to recognize whether a new data set has the characteristics of A, B or C. Once the model has been trained, the model is then able to compare a brand-new data set with all of the grouped training data and identify which group most resembles the new data. So, if training group A data had 1 hump, training group B had 2 humps and training group C had 3 humps (i.e., increases in value over time) and the machine learning model was shown new data with 1 hump, then the machine learning model would compare the new data with its trained understanding of each group and determine that the new data looks most similar to group A.

The motion data corrector module 108 may also perform a correction to the displacement of the IMU by correcting the velocities or any derivative of displacement. The motion deviation corrector submodule 130 ensures that the data generated by motions that (in reality) begin at an origin and return to the origin do not drift due to data collection limitations of technological collection rates. For example, a motion may start at an origin and return to origin in reality, yet the final calculated position may not reflect that. The motion deviation corrector submodule 130 will correct that discrepancy so that the final position reflects reality. This is important because data collection will typically have limitations and may require correction of some amount.

The motion deviation corrector submodule 130 ensures that the position of the sensor (IMU) at the end of each repetition matches the original position at the start of the repetition. This is necessary because of natural sensor collection bias. The data will naturally skew in a direction and, to ensure that the image that is displayed to the user most closely reflects reality, a correction is performed to the data depending on what motion was performed. On a full repetition where both the eccentric and concentric motions were captured in one motion data set, there is a calculated amount removed from each velocity data point. If the eccentric and concentric motions were performed separately, then the second motion may have a constant K gain applied to increase or decrease the magnitude of the velocity data points to ensure that the final position matches the initial position. For example, the constant K may be calculated as the position deviation at the end of the motion divided by the duration of time involved in the motion. In either case, the algorithm ensures that the final position matches the initial position.

Module 110 is an object speed distance tracker. The object speed distance tracker module 110 receives the normalized and corrected data from the data motion corrector 108 and determines speeds and distances traveled by the IMU, which represents a user's body or a portion of the user's body during the exercise session. This may include, for example, calculating speed and distance values for the motion of an arm during a bicep curl (i.e., the motion) based on the acceleration of the wrist where the wearable device is worn, potentially also based on known data corresponding to the user's height or arm length. In some examples, the speed and distance may be calculated based on sensor data from the wearable device alone without the use of user height data. For example, the wearable device may include position sensors capable of providing position data with respect to a local origin or reference or with respect to a global reference system. Specifically, the object speed distance tracker module 110 may include a speed algorithm that calculates the scalar of velocity from the velocity data points and a displacement algorithm, such as a standard kinematics equation, that calculates displacement from acceleration data, velocity data, or a combination of the two.

Module 112 is a heart rate data tracker. The heart rate data tracker 112 tracks health data output from a wearable device. The heart rate data tracker 112 may receive the raw heart rate tracking data and determine or generate additional data including a minimum heart rate during the activity session, a maximum heart rate during the activity session, an average heart rate, a moving average heart rate over a shorter period of time than the entire activity session, such as over the last 30 seconds or 1 minute, time spent in a target heart rate zone, and other such data. Though described with respect to heart rate data, the module 112 may receive and use other health data, such as blood pressure, blood glucose, body temperature, or other detectable physical data. Any and/or or of this health may be tracked and used to generate useful data for the user.

The heart rate data tracker data from the heart rate data module 112 and the object speed and distance tracker data from the object speed distance tracker 110 may be provided to a display module 114 for output on a display screen. The display may include a chart showing user movement, heart rate data, and other data relating to the activity session based on the data from the wearable device. The display screen may be a component of a user device, such as a smartphone, a tablet, a personal computer, or other suitable display. The display may also show a target heart rate zone, the minimum, maximum, average, and other health tracking data received from the heart rate data tracker. The display may also show a display of feedback for their current activity session, such as an exercise.

The feedback to the user may include a model or graphic representation illustrating the user's physical pose and motion in real-time or near real-time. The representation of the pose and motion data generated by the user's motion may be presented in addition to a model of recommended motion and pose data meant to instruct the user in proper technique. The feedback may also include a repetition count, timer or duration, or other activity tracking information. The activity or exercise tracking information is received from the workout tracker 116.

Module 116 is a workout tracker that uses the object speed and distance tracker data from the object speed distance tracker module 110 to determine workout statistics. The workout statistics can include, without limitation, a repetition count, a set count, a timer for an exercise set, consistency in repetition timing, and motion or range of motion for each set. In addition, the workout tracker may determine an exercise type. The exercise type may be manually input by the user in some examples. In some examples, the workout tracker may determine the exercise type from a predetermined list of exercise types based on the data received from the object speed and distance tracker. All such information may then be provided to the display module 114 for output to the user.

Module 118 is a workout feedback tracker that may use data from the heart rate data tracker 112, object speed distance tracker 110, workout tracker 116 and other parts of the control application 100 to provide feedback information to the user. This activity or workout feedback may include the accuracy of exercise form, their performance in the exercise based on cardiac range among other data, their workout pace, and may offer insights or suggestions on their workout.

Figure 7:
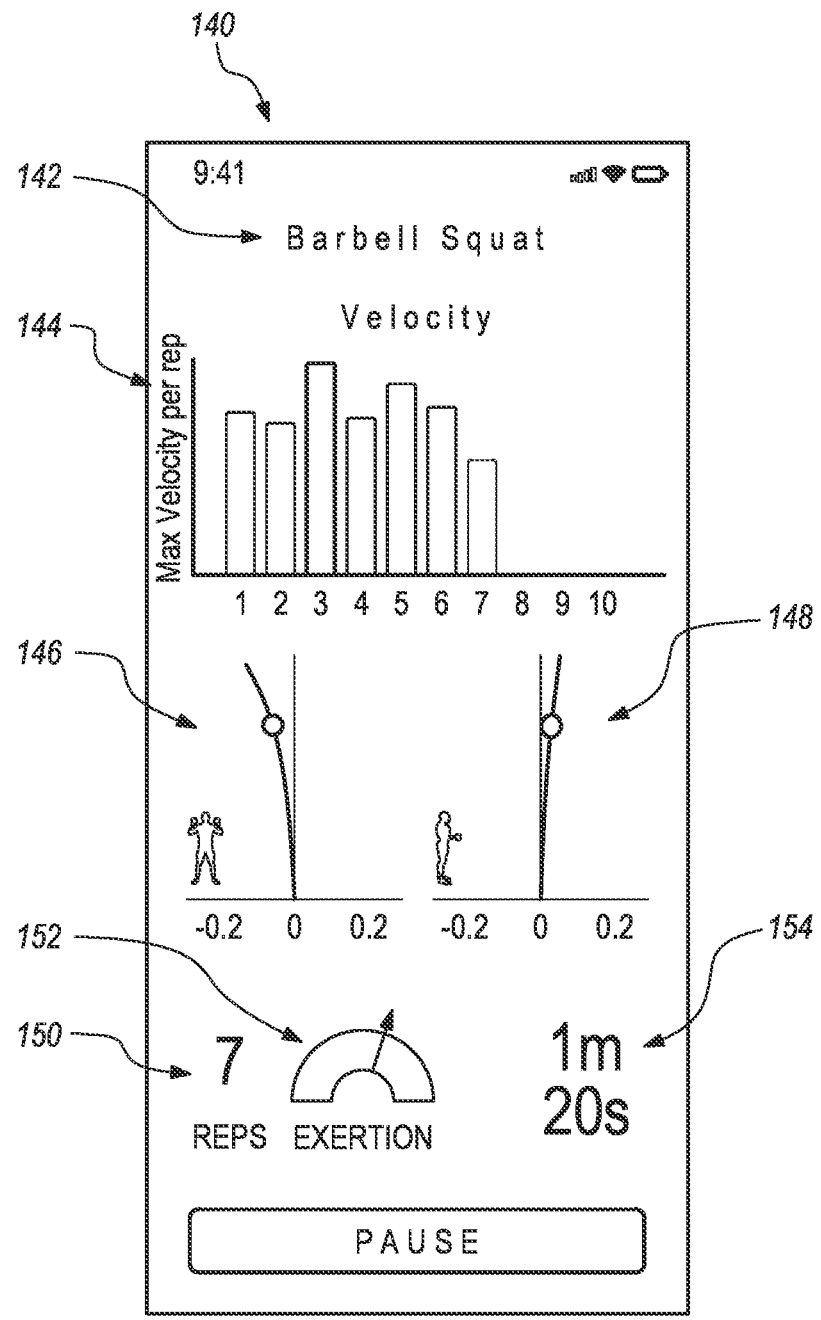
FIG. 7 is an illustration of a first graphical user interface that may be displayed on a display screen.

FIG. 7 is an illustration of a first graphical user interface 140 that may be displayed on a display screen, such as the screen a smartphone or other mobile computing device. The graphical user interface 140 includes various text, illustrations, graphs and icons output by the display module 114 of the control application 100. A header 142 indicates that the activity being performed by the user is a "barbell squat." The identity of this activity may be manually entered by the user or the control application may determine that predetermined motion data associated with a barbell squat most closely matches the motion of the user as detected by a wearable device and determined by the control application.

A chart 144 entitled "Velocity" is a bar chart of the maximum velocity per repetition (Y-axis) as a function of the repetition (X-axis) in a series of repetitions. So, the height of the bar represents the velocity of a given repetition and a color of the bar may be used to indicate whether the velocity was good (green), adequate (yellow), or poor (red). Accordingly, the user may utilize this feedback to adjust the velocity with which they perform subsequent repetitions of the barbell squats or a subsequent set of barbell squats. Furthermore, the chart 144 may be evidence that the user's barbell squat velocity begins to slow as fatigue set in at about repetition 7. Therefore, the feedback in the chart may instruct the user to increase the velocity for any subsequent barbell squat repetitions. Accordingly, embodiments may provide the technical advantage of providing real-time or near-real-time feedback and/or coaching to the user without requiring a coach or friend be present to provide feedback. Furthermore, the accuracy and level of detail provided by the control application is greater than what can be obtained from a coach or friend, such that the user may gain insights into their training that was not previously available.

A first diagram 146 illustrates a person from the back and the diagram includes a bar that bends to the left (with a blue dot) to indicate whether the person is leaning left or right from an ideal pose (i.e., vertical). The illustration of the person may simply be an icon that indicates the orientation of the lean relative to a person. For example, if the bar with the blue dot bends to the left of the vertical bar at the "0" value on the x-axis (i.e., toward the −0.2 value on the x-axis) as shown, then this indicates that the person is leaning to the left. Conversely, if the bar with the blue dot bends to the right of the vertical bar at the "0" value on the x-axis (i.e., toward the 0.2 value on the x-axis), then this would indicate that the person was leaning to the right.

The second (right) diagram 148 illustrates the person from their righthand side and the chart includes a bar that bends (with a yellow dot) to indicate whether the person is leaning forward or backward from an ideal pose (i.e., vertical). For example, if the bar with the yellow dot bends to the left of the vertical bar at the "0" value on the x-axis (i.e., toward the −0.2 value on the x-axis), then this indicates that the person is leaning backward relative to an ideal pose. Conversely, if the bar with the yellow dot bends to the right of the vertical bar at the "0" value on the x-axis (i.e., toward the 0.2 value on the x-axis) as shown, then this indicates that the person is leaning forward of an ideal pose.

The values −0.2, 0 and 0.2 on the x-axis may be unitless values representing how far from ideal (vertical) the user is leaning. Accordingly, the values displayed on the x-axis may dynamically increase or decrease to display a greater or lesser distance or angle of leaning.

The first graphical user interface 140 further includes a graphic 150 that identifies a count of barbell squat repetitions performed, a graphic 152 that shows a level of exertion, and a graphic 154 that identifies a time duration engaged in the barbell squats.

Figures 8A, 8B:
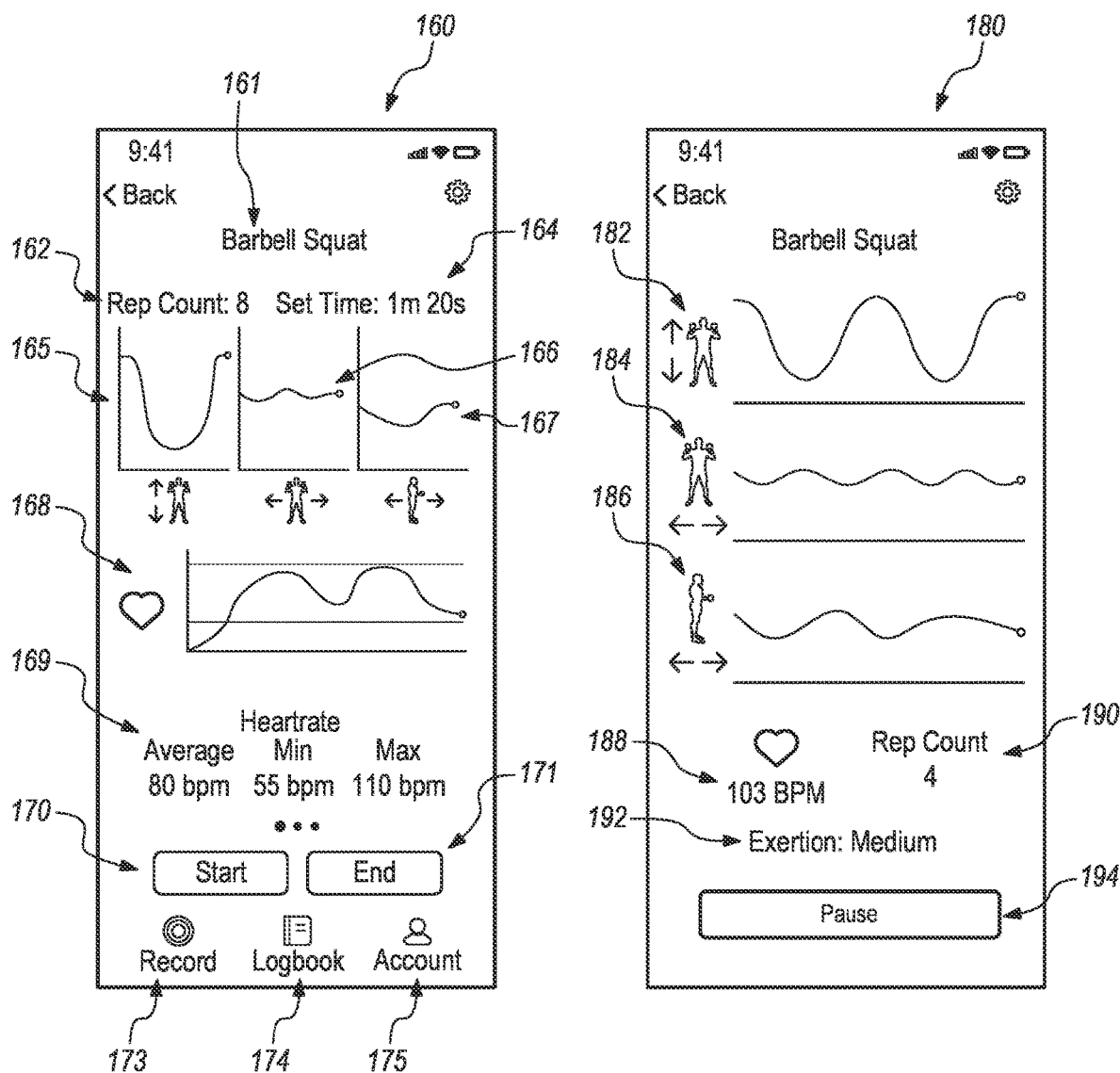
FIGS. 8A-B are illustrations of second and third graphical user interfaces that may be displayed on a display screen.

FIG. 8A is an illustration of a second graphical user interface 160 that may be displayed on a display screen, such as the screen a smartphone or other mobile computing device. The graphical user interface 160 includes various text, illustrations, graphs and icons output by the display module 114 of the control application 100 during or following an activity, such as a particular exercise set. The user interface 160 displays information including a header 161, repetition counts 162, time to complete the set 164, a vertical motion chart 165, a lateral chart 166, and forward/backward motion chart 167 during the set of exercises. The user interface 160 also provides a graph 168 of the heart rate of the user over the course of the exercise set, perhaps including before and after the workout, showing a recovery time. A summary of average, minimum, and maximum heartrate data is also displayed in a display area 169, in addition to summaries of other physical characteristics measured by the wearable device or other sensors in proximity or contact with the user. The user interface 160 also includes buttons 170, 171 for starting and stopping an exercise set as well as a record icon/button 173 for recording a summary of the workout session, a logbook icon/button 174 for writing a diary entry into a logbook, for example with notes from the exercise set, and a user account icon/button 175 for accessing a user account and user account settings, for example to change the user's preferences.

FIG. 8B is an illustration of a third graphical user interface 180 that may be displayed on a display screen, such as the screen a smartphone or other mobile computing device. The graphical user interface 180 includes various text, illustrations, graphs and icons output by the display module 114 of the control application 100. The user interface 180 includes three charts displaying motion (i.e., distance and/or velocity) of the user during the exercise in several different planes or axes. In this example, the charts include a vertical icon and motion chart 182, a lateral icon and motion chart 184, and a forward/backward icon and motion chart 186. The user interface 180 also displays real-time or near real-time heartrate data 188 and a real-time or near real-time repetition count 190 for the exercise set for easy viewing by the user. A difficulty setting or option 192 is displayed, where the user may, for example, select a low, medium, or high intensity workout. The selection of the different levels of exertion allows the system and the user interface 180, as determined by the control application, to guide the user to progress and continue with the exercise set at a predetermined rate, pace, weight, or other parameter based on the difficulty selection. The user interface 180 may also shows the current level of exertion of the user that may be based on rate, pace, user weight, cardiac rate, motion data, or other data from the system. The user interface 180 also includes a button 194 to pause the workout session, or other buttons to view elapsed time during the workout session, and record data relating to the exercise session. Where the graphs in FIGS. 8A and 8B do not have labels on their x-axis, the x-axis may be assumed to represent time.

It should be appreciated that information and graphics from any of the graphical user interfaces 140, 160, 180 may be combined with information and graphics from other graphical user interfaces, or include additional information and graphics not shown. The scope of the information and graphics is not limited to those shown, but may include other information and graphics disclosed in other discussions herein. Specifically, any of the data collected from the wearable device(s) and/or any of the data generated by the control application may be output to the display screen or other output device disclosed herein. Furthermore, the scope and nature of the information may vary widely based upon the nature of the activity being performed by the user while the wearable device measures motion and the control application performs data analysis. For example, if the activity is picking stock units from a warehouse, the control application may measure motion during each lifting task during a worker's shift and the output displayed on the graphical user interface may identify a number of items lifted, the average leaning of the worker during lifting, an increase in heart rate following each lift, and the like.

Furthermore, embodiments may include the use of multiple wearable devices during a given activity. Accordingly, the control application may process the motion data from the multiple wearable devices to identify the motion of each wearable device. As a result, the output to the user may combine information, insights and recommendations based on the motion of any one or more of the wearable devices. For example, consistent with the barbell squat example (see FIG. 1), a graphical user interface may provide feedback to the user regarding the position and/or motion of their knees, the position and/or motion of the wrists, and the like either alone or in combination.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to a person having an ordinary level of skill in the art.

Unless specifically stated otherwise, it is appreciated that throughout this specification discussions utilizing terms such as "processing," "computing," "calculating," "determining," and "identifying" or the like may refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, also be based on additional conditions or values beyond those recited. Headings, lists, and numbering included herein are for ease of explanation only and are not meant to be limiting.

The use of the terms "a" and "an" and "the" and similar referents in the context of describing the embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the embodiments unless otherwise claimed. No language in the specification should be construed as indicating any non-claimed element as begin essential to the embodiments.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

Other variations are within the scope of the embodiments. Thus, while the embodiments are susceptible to various modifications and alternative constructions, certain illustrated embodiments thereof are shown in the drawings and have been described above in detail. It should be understood, however, that there is no intention to limit the embodiments to the specific form or forms disclosed, but on the contrary, the embodiments to cover all modifications, alternative constructions, and equivalents, as defined in the appended claims.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing.

Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium storing program instructions configured to be executable by a processor to cause the processor to perform operations comprising:
    calibrating a sensor device secured to a body part of a person to identify a forward orientation of the person's body as a heading direction, wherein the sensor device includes an inertial measurement unit having a magnetometer, and wherein the heading direction is identified using the magnetometer;
    receiving three-dimensional motion data from the sensor device as the person performs an activity involving movement of the body part;
    adjusting, for each data point of the received three-dimensional motion data, the three-dimensional motion data to be represented from a perspective of the heading direction and to reduce drift, wherein each data point includes the three-dimensional motion data associated with a particular timestamp;
    determining, for each data point of the adjusted three-dimensional motion data, whether the sensor device is in a still state or an in motion state;
    forming a plurality of motion data groups from the adjusted three-dimensional motion data, wherein each motion data group includes a series of the data points that define a discrete motion, wherein the series of data points included in each motion data group includes a continuous string of data points for which the sensor device is determined to be in an in motion state and ends with a first data point for which the sensor device is determined to be in a still state following the continuous string of data points; and
    causing generation of output based on the data points in each motion data group.

2. The computer program product of claim 1, wherein the three-dimensional motion data includes acceleration data, the operations further comprising:
    producing, for each motion data group, averaged acceleration data by outputting a rolling average of the acceleration data within the motion data group; and
    inputting, for each motion data group, the averaged acceleration data to a frequency filter that passes signals with a frequency lower than a selected cutoff frequency and attenuates signals with frequencies higher than the cutoff frequency, wherein the output is generated from the filtered averaged acceleration data.

3. The computer program product of claim 2, wherein the frequency filter is a Butterworth filter.

4. The computer program product of claim 1, wherein the inertial measurement unit includes an accelerometer, a gyroscope, and the magnetometer, wherein the accelerometer measures three-dimensional acceleration of the sensor device and generates three-dimensional acceleration data, the gyroscope measures three-dimensional angular velocity of the sensor device and outputs three-dimensional angular velocity data, and the magnetometer measures three-dimensional earth magnetic field and outputs three-dimensional earth magnetic field data.

5. The computer program product of claim 1, the operations further comprising:
    identifying an activity being performed by the person;
    accessing predetermined form data associated with the identified activity;
    determining a magnitude and a direction of a deviation between the adjusted three-dimensional motion data and the predetermined form data; and
    displaying the output including an image indicating the magnitude and the direction of the deviation.

6. The computer program product of claim 5, wherein identifying the activity includes comparing, for each of a plurality of activities, at least a portion of the adjusted three-dimensional motion data to at least a portion of predetermined form data associated with the activity, wherein the activity being performed by the person is identified as one of the plurality of activities that is associated with the at least a portion of the predetermined form data that most closely matches the at least a portion of the adjusted three-dimensional motion data.

7. The computer program product of claim 5, wherein identifying the activity includes receiving user input identifying the activity.

8. The computer program product of claim 7, wherein the identified activity is selected from a predetermined list of activities.

9. The computer program product of claim 8, wherein the predetermined list of activities is a list of exercises.

10. The computer program product of claim 5, wherein the output is sent to a display device to display the image, wherein the image identifies the magnitude as a numerical value of the deviation between the adjusted three-dimensional motion data and predetermined motion data for the activity in near real-time.

11. The computer program product of claim 5, wherein the output is sent to a display device to display the image, wherein the image identifies a correction with magnitude and direction necessary to eliminate the deviation between the adjusted three-dimensional motion data and predetermined motion data for the activity.

12. The computer program product of claim 5, wherein the output includes information that the person may use to correct a form in which the activity is performed.

13. The computer program product of claim 5, the operations further comprising:
    causing generation of output indicating that the person should stop performing the activity in response to the deviation becoming greater than a predetermined deviation setpoint.

14. The computer program product of claim 1, the operations further comprising:
    receiving input indicating that the person is ready to perform an activity, wherein the inertial measurement unit is calibrated in response to receiving the input; and
    causing generation of a user detectable notification to begin performing the activity in response to completing an initial calibration of the inertial measurement unit.

15. The computer program product of claim 1, wherein the output is sent to a device selected from a display device, speaker, haptic device and combinations thereof.

16. The computer program product of claim 1, the operations further comprising:
    identifying an activity being performed by the person;
    accessing predetermined form data stored in association with the identified activity, wherein the adjusted three-dimensional motion data describes first and second components of motion relative to the heading direction, and wherein the predetermined form data describes first and second components of motion;
    determining a first deviation between the first component of motion described by the adjusted three-dimensional motion data and the first component of the predetermined form data;
    determining a second deviation between the second component of motion described by the adjusted three-dimensional motion data and the second component of the predetermined form data;
    generating a first output based on the first deviation; and
    generating a second output based on the second deviation, wherein the first output is different than the second output.

17. The computer program product of claim 16, wherein the first deviation is a first direction of the body part relative to the heading direction and the second deviation is a second direction of the body part relative to the heading direction, and wherein the first output is a first visual indicator for display and the second output is a second visual indicator for display.

18. The computer program product of claim 16, wherein the first component of motion is motion in a forward or backward direction relative to the heading direction and the second component of motion is motion in a left or right direction relative to the heading direction.

19. The computer program product of claim 1, wherein the processor is a component of a mobile communication device, and wherein the mobile communication device receives the three-dimensional motion data from the sensor device over a short-range wireless connection.

20. The computer program product of claim 19, wherein the three-dimensional motion data is received from the sensor device in a stream of timestamped packets.

21. The computer program product of claim 1, wherein the sensor device is included in a wearable smart device.

22. The computer program product of claim 1, the operations further comprising:
    normalizing the three-dimensional motion data;
    correcting the normalized three-dimensional data; and
    determining a speed and displacement of the sensor device based on the corrected normalized three-dimensional data, wherein the output is based on the speed and displacement of the sensor device.

23. The computer program product of claim 1, the operations further comprising:
    receiving user input selecting an activity regimen including a plurality of activities for the person to perform, wherein each activity in the plurality of activities is associated with predetermined form data; and
    causing, for each of the plurality of activities, generation of output indicating completion of the activity based on the adjusted three-dimensional motion data.

24. The computer program product of claim 1, the operations further comprising:
    storing the output generated based on the adjusted three-dimensional motion data; and
    allowing an authorized person other than the person performing the activity to remotely access the stored output.

25. The computer program product of claim 1, wherein the data points for which the sensor device is determined to be in a still state are not included in any of the motion data groups except for the first data point for which the sensor device is determined to be in a still state following the continuous string of data points.

26. The computer program product of claim 1, the operations further comprising:
nullifying the data points for which the sensor device is determined to be in a still state other than the first data point in each of the motion data groups for which the sensor device is determined to be in a still state following the continuous string of data points.

27. The computer program product of claim 1, the operations further comprising:
calculating, for each data point of the three-dimensional motion data, the multiplication product of a value of acceleration and a value of jerk, wherein the value of acceleration is provided by the data point and the value of jerk is the first derivative of the acceleration;
wherein the sensor device is determined to be in a still state in response to the multiplication product being within a predetermined range of values; and
wherein the sensor device is determined to be in an in motion state in response to the multiplication product being outside the predetermined range of values.

28. The computer program product of claim 1, the operations further comprising:
calculating, for each data point of the three-dimensional motion data, the multiplication product of a value of acceleration and a value of jerk, wherein the value of acceleration is provided by the data point and the value of jerk is the first derivative of the acceleration;
wherein the sensor device is determined to be in a still state in response to the multiplication product being within a predetermined range of values for a set number of consecutive data points; and
wherein the sensor device is determined to be in an in motion state in response to the multiplication product being outside the predetermined range of values for a set number of consecutive data points.

29. The computer program product of claim 1, the operations further comprising:
calculating, for each data point of the three-dimensional motion data, the multiplication product of a value of acceleration and a value of jerk, wherein the value of acceleration is provided by the data point and the value of jerk is the first derivative of the acceleration;
wherein the sensor device is determined to be in a still state in response to the multiplication product being within a predetermined range of values for a set number of consecutive data; and
wherein the sensor device is determined to be in an in motion state in response to the multiplication product being outside the predetermined range of values for a set number of data points within a sliding window of data points.

30. The computer program product of claim 1, wherein each data point of each motion data group includes an acceleration value, the operations further comprising:
adjusting, for each data motion group, the acceleration value for each data point within the data motion group so that the data motion group starts and ends with no velocity.

31. The computer program product of claim 1, wherein each data point of each motion data group includes an acceleration value, the operations further comprising:
adjusting, for each data motion group, the acceleration value for each data point within the data motion group by subtracting an average acceleration of all data points within the data motion group.

32. The computer program product of claim 1, the operations further comprising:
identifying a motion category associated with each of the data motion groups, wherein the motion is selected from a half repetition, eccentric repetition, concentric repetition, and full repetition; and
correcting data points within each data motion group based on the motion category identified for the data motion group.

33. An apparatus, comprising:
at least one non-volatile storage device storing program instructions; and
at least one processor configured to process the program instructions,
wherein the program instructions are configured to, when processed by the at least one processor, cause the apparatus to perform operations comprising:
calibrating a sensor device secured to a body part of a person to identify a forward orientation of the person's body as a heading direction, wherein the sensor device includes an inertial measurement unit having a magnetometer, and wherein the heading direction is identified using the magnetometer;
receiving three-dimensional motion data from the sensor device as the person performs an activity involving movement of the body part;
adjusting, for each data point of the received three-dimensional motion data, the three-dimensional motion data to be represented from a perspective of the heading direction and to reduce drift, wherein each data point includes the three-dimensional motion data associated with a particular timestamp;
determining, for each data point of the adjusted three-dimensional motion data, whether the sensor device is in a still state or an in motion state;
forming a plurality of motion data groups from the adjusted three-dimensional motion data, wherein each motion data group includes a series of the data points that define a discrete motion, wherein the series of data points included in each motion data group includes a continuous string of data points for which the sensor device is determined to be in an in motion state and ends with a first data point for which the sensor device is determined to be in a still state following the continuous string of data points; and
causing generation of output based on the data points in each motion data group.

34. A method, comprising:
calibrating a sensor device secured to a body part of a person to identify a forward orientation of the person's body as a heading direction, wherein the sensor device includes an inertial measurement unit having a magnetometer, and wherein the heading direction is identified using the magnetometer;
receiving three-dimensional motion data from the sensor device as the person performs an activity involving movement of the body part;
adjusting, for each data point of the received three-dimensional motion data, the three-dimensional motion data to be represented from a perspective of the heading direction and to reduce drift, wherein each data point includes the three-dimensional motion data associated with a particular timestamp;

determining, for each data point of the adjusted three-dimensional motion data, whether the sensor device is in a still state or an in motion state;

forming a plurality of motion data groups from the adjusted three-dimensional motion data, wherein each motion data group includes a series of the data points that define a discrete motion, wherein the series of data points included in each motion data group includes a continuous string of data points for which the sensor device is determined to be in an in motion state and ends with a first data point for which the sensor device is determined to be in a still state following the continuous string of data points; and causing generation of output based on the data points in each motion data group.

35. The method of claim 34, wherein causing generation of output based on the data points in each motion group includes forming and displaying, with a computer, a visual indicator that identifies a deviation in form of the person performing the activity relative to an ideal form for the activity.

36. The method of claim 35, wherein the visual indicator provides information that the person may use to alter their form performing the activity to reduce the deviation in response to the displayed visual indicator.

* * * * *